US005494947A

United States Patent [19]

Kaplan

[11] Patent Number: 5,494,947
[45] Date of Patent: Feb. 27, 1996

[54] METHOD FOR PRODUCING FLEXIBLE DRYWALL JOINTS, FLEXIBLE DRYWALL JOINT COMPOUND

[75] Inventor: James C. Kaplan, Dallas, Tex.

[73] Assignee: Lynxx International Inc., Olympia Fields, Ill.

[21] Appl. No.: 331,177

[22] Filed: Oct. 28, 1994

[51] Int. Cl.⁶ ................................. C08K 5/3432
[52] U.S. Cl. ................. 523/122; 524/310; 524/364; 524/365; 524/764; 524/765; 524/767; 156/327; 156/330.9
[58] Field of Search ................. 523/122, 218, 523/219; 156/327, 330.9; 524/292, 765, 767, 310, 365, 364, 377

[56] References Cited

U.S. PATENT DOCUMENTS

| | | | |
|---|---|---|---|
| 2,797,201 | 6/1957 | Veatch et al. | 524/218 |
| 3,686,111 | 8/1972 | Makhlouf et al. | 524/310 |
| 3,941,632 | 3/1976 | Swedenberg et al. | 156/327 |
| 4,425,469 | 1/1984 | Emmons et al. | 524/767 |
| 4,562,226 | 12/1985 | Coombes et al. | 524/767 |
| 4,820,754 | 4/1989 | Negri et al. | 524/427 |
| 5,079,042 | 1/1992 | Frings | 524/8 |
| 5,374,665 | 12/1994 | Isaka et al. | 523/122 |
| 5,384,345 | 1/1995 | Naton | 524/365 |

*Primary Examiner*—Veronica P. Hoke
*Attorney, Agent, or Firm*—Cherskov & Flaynik

[57] ABSTRACT

A joint compound which remains flexible upon curing and therefore tailored for manufactured housing processes, comprising an acrylate, a biocide, a reinforcing agent, a latex, a first surfactant, a plasticizer, a coalescent agent, a fungicide, a filler, and a second coalescent, all materials being present in predetermined weight percents. A method for producing flexible joints is also provided whereby joints formed by abutting panels are sealed with a joint compound, said joint compound having the characteristic of remaining flexible upon curing or setting.

15 Claims, No Drawings

METHOD FOR PRODUCING FLEXIBLE DRYWALL JOINTS, FLEXIBLE DRYWALL JOINT COMPOUND

BACKGROUND OF THE INVENTION

1. Field of the Invention

This invention relates to a method of producing flexible joints and to a flexible drywall joint compound, and more particularly to a method of producing flexible joints in fabricated housing drywall construction and to a drywall joint compound that does not harden upon curing.

2. Background of the Invention

Manufactured housing continues in its popularity of producing good quality homes for relatively lower cost compared to custom built homes. Entire home surfaces, such as floors, ceilings or walls, having dimensions in excess of 20 by 80 feet are constructed in this manner. Such surfaces must be blemish free when installed and still maintain a level of fire resistance and structural integrity.

Typically, the construction of drywall surfaces is a multi-step process of finishing the joints formed by abutting edges of drywall panels. First, a prefill coat of a joint compound is contacted with the joint. This prefill must be allowed to dry (approximately 1 to 8 hours) before proceeding to the second step. The second step is the application of an embedding coating into which is pressed joint tape before said embedding coat dries. After the embedding coat dries, which can take up to approximately 1 to 3 hours, the third step follows, involving applying a "feathering" coat to the now taped joint. That coat must also dry for the same amount of time required for the first two coats. Finally, the fourth and final step involves applying a finishing coat to cover all preceding coats. The finishing coat also has a drying time requirement. All total, the fabrication process can require up to 24 hours, primarily due to the drying time requirements involved.

A problem exists in current wall and ceiling manufacturing processes whereby differences in the textures of the drywall face paper and the joint compound result in unequal absorption characteristics viz-a-viz subsequent coating applications. Also, the problem of "joint banding" or "photographing" occurs when raised paper fibers develop as a result of the inadvertent roughening of the drywall paper during sanding operations. These surface abnormalities prove difficult to hide, particularly when followed by the application of gloss or semi-gloss paints.

Methods exist to conceal these abnormalities, including applying a skim coat of the joint compound over the entire wall surface in an effort to provide a painting surface with uniform porosity and texture. However, skim coats do not have sufficient "hold out" to prevent the penetration of water or solvent from the finish coat of paint. To address this problem, primers and sealers must be used. Sealers must have a resin content high enough to lay down a film for good hold out. Primers must be added to build up the film so that texture differences are concealed. An alternative approach, as disclosed in U.S. Pat. No. 4,820,754, supplants the need of primers and sealers by a special paint formulation.

All of the drywall surface fabrication and finishing steps and alternative methods discussed supra require large amounts of time to complete. A major bottleneck, then, in each step of the fabrication process is the necessity to allow applied coatings and films to completely dry before subsequent treatment. One finishing system (U.S. Pat. No. 5,079,042) claims to eliminate the need for taping via the incorporation of fibers in the joint compound mixture. However, that process still requires that the applied coatings thoroughly dry prior to further treatment.

The problem of idle operations in drywall fabrication is no where more acute than in the manufactured housing process, whereby from 7 to 18 floors must be fabricated and transported per plant per day.

Problems also occur when manufactured homes or manufactured home modules are moved from the point of fabrication to the home site. Invariably, the action of transport results in excessive mechanical stress which causes cracks to form in the joints of fabricated drywall surfaces. Repair to these joints can cost hundreds of dollars, while providing less than optimal results cosmetically and structurally. Ultimately, this added cost is borne by the home owner.

To date, nothing exists on the market to expedite fabrication of drywall surfaces, or to provide a low cost alternative to after-fabrication repair of drywall surfaces, and large surfaces containing joints.

A need exists in the art to provide a joint compound that can be coated or otherwise manipulated while still wet. Upon curing or setting, the compound also must maintain a level of flexibility to prevent manufactured housing modules from cracking at drywall joints during transport or final assembly. The needed joint compound and method for construction must be cost effective compared to costs associated with after-fabrication repair, said repair occurring either at the end of the fabrication process at the factory, or at the homesite.

SUMMARY OF THE INVENTION

It is an object of the present invention to provide a joint compound, and a method for fabricating manufactured housing drywall modules that overcome many of the disadvantages of the prior art.

Another object of the present invention is to provide a joint compound that is used in manufactured housing processes. A feature of the invention is that the joint compound remains relatively flexible even after setting or curing. An advantage of the invention is that drywall ceilings, floors, walls or other large surfaces that are constructed with the joint compound do not crack during transport or final assembly at the homesite.

Still another object of the present invention is to provide a method for fabricating drywall surfaces which will withstand transport and installation without cracking. A feature of the present invention is the use of a joint compound that does not become brittle upon setting. An advantage of the present invention is that the drywall surfaces will not sustain cracks in the factory-applied joint compound areas during transport or during installation at the building site.

Yet another object of the present invention is to provide a joint compound to be used in the fabrication of drywall surfaces that is formulated to comply with current manufacturing practices. A feature of the joint compound formulation is that it does not stretch. An advantage of the formulation is that walls constructed with the formulation can sustain higher torsional stresses without joint fraction, compared to joints constructed using typical plaster-type joint compounds.

Still another object of the present invention is to provide a joint compound that can streamline the production of prefabricated floors, walls and ceilings. A feature of the invention is the incorporation of latex into the joint compound material. An advantage of the invention is the facilitation of applying a wet coating on top of another wet coating during the fabrication process while assisting the integrity of film as a final surface. Another advantage is that the invented compound obviates the need for a prefill coating.

Another object of the present invention is to provide a joint compound for both rigid and flexible planar surfaces. A feature of the invention is its adhesive qualities and characteristics. An advantage of the invention is that it can be used to dampen mechanical stress and strain.

In brief, the objects and advantages of the present invention are achieved by providing a drywall joint compound which remains flexible upon curing comprising an acrylate in a predetermined weight percent; a biocide in a predetermined weight percent; a reinforcing agent in a predetermined weight percent; a latex in a predetermined weight percent; a first surfactant in a predetermined weight percent; a plasticizer in a predetermined weight percent; a coalescent agent in a predetermined weight percent; a fungicide in a predetermined weight percent; a filler in a predetermined weight percent; and a second coalescent in a predetermined weight percent.

The objects and advantages of the present invention also are achieved by providing a method for producing flexible drywall joints comprising supplying a first planar substrate having a first edge; abutting a second edge of a second planar substrate against said first edge of the first planar substrate, thereby forming a joint; applying a predetermined amount of a drywall joint compound to the joint to provide a seamless surface, said drywall joint compound having the characteristic of remaining flexible upon curing; and finishing the seamless surface by applying a coating to the seamless surface shortly after the said seamless surface is created.

DETAILED DESCRIPTION OF THE INVENTION

The invented material provides an advantage over the typically-used joint compounds in that it is formulated to allow for the application of a wet coating over another. Such wet coatings include vapor barriers, paints, caulks, elastomerics and sealants. The invented material has additional utility in that even after a set time of approximately 18 hours the mixture remains workable. Even after all of the resin in the mixture has coalesced, i.e., after the mixture has cured in approximately 24 hours, the material remains flexible indefinitely.

The multi-step fabrication process begins with the application of the flexible compound onto the joint surfaces formed by abutting, flat planar substrates, such as drywall sheeting. Application thicknesses can range anywhere between 0.1 millimeters (mm) to 150 mm, and more typically from 5 mm to 25.40 mm. The flexible joint material is applied in typical mechanical fashion, i.e., extruded as a caulk or spread as a knife-grade or trowel-grade paste.

A salient feature of the invented material is its ability to be overlaid with a wet-film while itself still wet. This provides a crucial advantage in fabricated housing operations which emphasize expedited through-put. Whereas other joint materials require complete or nearly complete drying before being sprayed with a vapor barrier or painted, (therefore requiring hours before allowing subsequent surface treatment) the invented flexible joint compound product can withstand painting or other wet-coating deposition in approximately 15 minutes after first being applied. Application temperatures can range from between approximately 40° F. to 130° F. The inventor has found that high application temperatures facilitate expedited fabrication of the surfaces.

The invented mixture accommodates the high through-put requirements of manufactured housing processes via the incorporation of latices (i.e., latexes). These aqueous dispersions, such as styrene butadiene copolymers, polystyrene and vinyl polymers and copolymers, or other resin suspensions, allow the invented mixture to abide the wet-on-wet manufacturing steps associated with the high productivity requirements of the fabricated housing plant.

If wet-on-wet treatment is not necessary, then latex can be eliminated (along with fillers), the resulting material then being suitable for other applications. Aside from use as a flexible drywall paste, for example, the invention also can be used as a caulking material for windows, masonry and other outside applications, a thermal insulator, a vibration dampener, as carpet backing, and as an adhesive.

As a thermal insulating adhesive, the invented material supplants the need for mechanical assists in such applications as the construction of wall panels, ceilings and floors. In one application, the invented material serves as a bonding agent wherein polystyrene sheeting, sandwiched between sheet metal or other types of galvanized metal panels, is bonded thereto. In this application, the invented mixture is first applied to the contact surfaces of the sheeting and panels, in thicknesses ranging from between approximately 5 mm and 25 mm. Upon mechanical application of the material via for example a troweling means, the adhesive is allowed to equilibrate for approximately 0 to 10 minutes. The sheeting is then contacted with the inner surfaces of the metal panels to form a three-substrate configuration, which is ready for installation in approximately 15 minutes. Such applications result in the low cost construction of structural members and with high R values.

Compounding Protocol

Standard mixing equipment is used to produce the invented material, including, but not limited to, stainless steel mixing tanks with variable torque coles disperser, horizontal mixers with paddle-type (90° offset) or sigmoid type mixing blades, and miscellaneous handling equipment and balance scales. Generally, in following the compound protocol, the resulting joint compound mixture will attain a viscosity of between approximately 150,000 to 300,000 centipoises (cp), and preferably a viscosity of 200,000 cp.

The mixture comprises materials that must be combined in a well defined compounding protocol. Generally, the compound operation outlined infra can be performed at a myriad of temperatures and pressures, but preferably at a temperature selected from a range of between approximately 45° F. and 100° F. and at a pressure selected from a range of between approximately 0.9 atm and 1.2 atm.

Particular chemical species of the classes of chemicals specified in this protocol section, along with formula weights, are disclosed under the subheading "Preferred Constituent Detail," infra. Unless otherwise designated, the disclosed formula weights are based on the total weight of the resulting flexible drywall joint compound.

1. As a first step in the compound protocol, formula amounts of a selected acrylate are added to the disperser tank.
2. Upon activation of the disperser (slow speed preferred) an amount of a biocide is added in a range of between approximately 0.10 and 0.15 weight percent.

3. Upon mixing, a formula amount of a polyamide material is added. When using polyamide fibers, for example in the production of drywall compound material, said fibers should be crumbled into small pieces of between approximately 0.01 cm and 2.54 cm prior to combining them with the acrylate and preservative. The slow speed of the disperser tank should be maintained until all fibers are "wet," or inducted.
4. After thorough wetting of the fibers, the speed of the disperser tank is increased preferably to a "high" setting. At this juncture, the objective is to obtain a dispersed mixture which will knife down with no streaking or clumps of undispersed material. As such, once the high speed mixing rate is established, it should be maintained until the desired consistency is noted. Depending on ambient conditions, 10 minutes or more may be required.
5. When a knifing-down consistency is obtained, a selected latex is added at its predetermined formula weight, at low speed and blended for approximately 5 minutes.
6. The disperser should then be turned off and the mixture transferred to a mud-mixing (redi-mix) machine.
7. Upon subsequent agitation of the mixture, a predetermined formula amount of a selected surfactant is allowed to completely combine with the mixture.
8. The next compound step involves adding a formula amount of a plasticizer. Such a plasticizer is required to impart improved flexibility, tack and bonding properties to the latex mixture. Upon addition, the resulting mixture is mixed thoroughly, for approximately 5 to 10 minutes.
9. A fungicide is next added to the mixture, in a predetermined weight percent.
10. To the resulting combination is sifted a formula amount of a filler. Such a filler should be fairly inert, a good choice being calcium carbonate. Other fillers, such as sand, pumice, titanium dioxide such as rutile, powdered nickel, zirconium oxides, clays, attapulgite, and mica are also suitable. The range of formula weight percent is approximately 0–35%. The filler should be blended completely before proceeding to the next step.
11. A predetermined formula amount of polyacrylate microspheres is then added as another filler. Expanceil DE-51520, from Nobel Industries, Sweden, provides optimal results. Formula weight ranges of between 0 and 25.0 percent, and preferably 0 to 5 percent are suitable when producing drywall compound. When preparing the mixture to be more insulative, and less elastic, little or no fiber reinforcement material is used, with a concomitant increase in formula weight of the microspheres of up to 50 percent. The mixing-in of the polyacrylate microspheres must result in a smooth draw-down.
12. Lastly, to the mixture is added a coalescing agent, designed to promote uniform color development, scrub resistance and lower film-forming temperatures.

Preferred Constituent Detail

The selected acrylate, as enumerated in the initial step of the compounding procedure, is an acryl ester, styrene copolymer. Suitable acrylates are methyl, ethyl, butyl, or 2-ethylhexyl. A preferred acrylic is the acrylic ester, styrene copolymer known as WRL-01280, available through B.F. Goodrich in Gastonia, N.C. Weight percent ranges of between 40 to 60 percent are preferred.

One type of biocide (added in step 2) found preferable to the inventor is a liquid, water soluble organic incan preservative called Troysan 192, from Troy Chemicals, Newark, N.J. Troysan has the IUPAC formula 2[(Hydroxymethyl) amino]-2-methyl propanol. Generally, however, a broad spectrum biocide formulated to stymie bacterial action in latex paints, resin emulsions, adhesives, pigment dispersions, and joint cements is appropriate. Representative bacteria to be stymied include *Bacillus subtills, Desulfovibrio desulfuricans, Enterobacter aerogenes, Escherichia coil, Proteus vulgaris, Pseudomonas aeruginosa, Pseudornonas fluorescens, Staphlyococcus aure* 45, *Streptococcus feacalis, Aspergillus niger,* Cladosporium sp and Penicillin sp.

Different types of polyamide material, as recited in step 3, can be incorporated into the compounding process, depending on the ultimate use of the material. For example, fiber, such as Kevlar® 6F 543 from DuPont®, can be incorporated into a drywall joint compound composition to render the resulting joint flexible, analogous to the action of a hinge. If the material is to be used as a caulk, however, a microspheric material, bead-like in shape, could be used as a thickening agent. Orgasol® microspheres, available through AFE, France, is a good choice. Generally, weight percent ranges of between approximately 0.5 percent and 3.0 percent will provide the desired reinforcement or viscosity characteristics.

Selected latices (i.e. latexes, step 5), include, but are not limited to, styrene butadiene copolymer, polystyrene, vinyl polymers and copolymers. A preferred styrene butadiene copolymer is available through B.F. Goodrich as WRL-0706. Preferred formula weight ranges are approximately 20 percent by weight of the selected acrylate used in the initial compounding step.

A myriad of surfactants can be used at the mud-mix processing juncture (step 7) of the compounding operation. The inventor has found that tertiary actylenic diols provide good results. One such diol, a tetramethyl decyndiol, having the IUPAC formula 2,4,7,9-tetramethyl-5-decyn-4,7-diol, is available as Surfynol® 104 surfactant by Air Products, of Allentown, Pa. Formulation ranges of surfactant between approximately 0.10 percent and 0.20 percent provide optimal results.

The inventor has found that high solvating plasticizers (added in step 8) impart high strength to the flexible joint compound mixture. One such class of plasticizers providing optimal results are the liquid benzoate esters. One such ester, dipropylene glycol dibenzoate, sold as Benzoflex® 9-88 by Velsicol, located in Rosemont, Ill., provides excellent results. The formula weight percents will range anywhere from 0 to 8 percent.

Pyrithiones, also known as 2-mercaptopyridine-N-oxide, 1-hydroxypyridine-2-thione, and 2-pyridinethiol-1-oxide have been found by the inventor to provide good fungicidal action (step 9). A zinc derivative (a chelated complex) known as zinc pyrithione, available as Zinc Omadine from Olin Corporation, Waterbury, Conn., provides good results. The IUPAC formula for the zinc derivative is bis[1-hydroxy-2 (1H)-pyridinethionato-O,S]-(T-4) zinc. Formula weight percents of this material range from approximately 0.18 to 0.20 percent.

The final ingredient, a coalescent agent to the mixture, is added (step 12) to provide good hydrolytic stability and low water solubility. The inventor has found that ester alcohols are suitable compounds. A particular alcohol, available as Texanol from Eastman Chemical Company, Kingsport, Tenn., provides optimal results. The IUPAC formula is 2,2,4-trimethyl-1,3-pentanediol monoisobutyrate. Formula weight percentages which provide good results range from approximately 0.5 to 2 percent, and preferably 0.5 to 1.1 percent.

Uses and Applications

A myriad of uses of the resulting formulation is available. In applications involving the fabrication of rigid or nonrigid planar surfaces, wherein the abutting edges of the surfaces are to be concealed for cosmetic and insulative purposes, the entire formulation, as disclosed supra, offers superior results. The formulation is especially applicable in fabricated housing processes wherein entire manufactured ceilings or walls, spanning up to 80 feet in length, must withstand torsional strains during transport and ultimate installation. The use of the invented flexible drywall compound imparts high Young's modulus characteristics to the drywall joints, thereby preventing the formation of cracks that otherwise occur when standard joint compound is used.

EXAMPLE 1

The following list of compounds and weight percents represent an optimal formula for a flexible drywall joint compound:

| Material Name | Generic Designation | Wt. % |
|---|---|---|
| WRL 01280 Latex | Acrylic Ester, Styrene copoly. | 47.2 |
| Kevlar ® | Polyamide Fiber | 1.5 |
| WRL-0706 | Styrene Butadiene poly. | 9.4 |
| Benzoflex 9-88 | Dibutyl phthalate | 6.2 |
| Surfynol 104H | Acetylenic Diol | 0.18–0.19 |
| Zinc Omadine | Pyrithione derivative | 0.18–0.19 |
| Troysan 192 | incan preservative | 0.11 |
| Expancell WD 551-20 | Polyacrylate microspheres | 2.9 |
| Calcium Carbonate | | 32.1 |

EXAMPLE 2

As discussed supra, the formulation, without filler and/or latex, can also be used as a thermal barrier, and an adhesive. An exemplary formula for such an application is the following:

| Material Name | Generic Designation | Wt. % |
|---|---|---|
| WRL 01280 Latex | Acrylic Ester, Styrene copoly. | 85.5 |
| Kevlar ® 6F543 | Polyamide | 2.5 |
| Benzoflex 9-88 | Dibutyl phthalate | 11.3 |
| Zinc Omadine (48%) | Pyrithione derivative | 0.34 |
| Troysan 192 | incan preservative | 0.21 |

While the invention has been described with reference to details of the examples, these details are not intended to limit the scope of the invention as defined in the appended claims.

The embodiment of the invention in which an exclusive property or privilege is claimed is defined as follows:

1. A joint compound which remains flexible upon curing and which is overlaid with wet film while still wet comprising:
   a.) an acrylate resin in a weight percent selected from a range of between approximately 40 percent and 60 percent;
   b.) an incan preservative in a weight percent selected from a range of between approximately 0.10 percent and 0.15 percent;
   c.) a polyamide fiber in a weight percent selected from a range of between approximately 0.5 percent and 3.0 percent;
   d.) a latex in an amount of approximately 20 percent by weight of said acrylate resin:
   e.) a surfactant in a weight percent of between 0.1 and 0.2;
   f.) a plasticizer in a weight percent selected from between approximately 0 and 8 percent;
   g.) a filler in a weight percent selected from a range of between approximately 0 and 35 percent;
   h.) a pyrithione in a weight percent selected from a range of between approximately 0.18 and 0.20 percent; and
   i.) an ester alcohol in a weight percent selected from a range of between approximately 0.5 and 2.0.

2. The joint compound as recited in claim 1 wherein the acrylate resin is an acryl ester styrene copolymer.

3. The joint compound as recited in claim 1 wherein the incan preservative is 2(Hydroxymethylamino)-2-methylpropanol.

4. The joint compound as recited in claim 1 wherein the latex is selected from the group consisting of styrene butadiene copolymer, polystyrene, homo polymers, and combinations thereof.

5. The joint compound as recited in claim 1 wherein the surfactant is a tertiary acetylenic diol.

6. The joint compound as recited in claim 1 wherein the plasticizer is a liquid benzoate ester.

7. The joint compound as recited in claim 1 wherein the filler is calcium carbonate.

8. The joint compound as recited in claim 1 wherein the ester alcohol is 2,2,4-trimethyl-1,3-pentane diol monoisobutyrate.

9. A method for producing flexible joints comprising:
   a.) supplying a first planar substrate having a first edge;
   b.) abutting a second edge of a second planar substrate against said first edge of the first planar substrate, thereby forming a joint;
   c.) applying a predetermined amount of a joint compound to the joint to provide a seamless surface, said joint compound having the characteristic of remaining flexible upon curing and consisting essentially of an acrylate resin in a weight percent of between approximately 40 and 60 percent, an incan preservative in a weight percent of 0.10 and 0.15, a polyamide fiber in a weight percent of 0.5 and 3.0, a latex in an amount of approximately 20 percent by weight of said acrylate resin, a surfactant in a weight percent of between 0.1 and 0.2, a plasticizer in a weight percent of between 0 and 8, a filler in a weight percent of between approximately 0–35, a pyrithione in a weight percent of 0.18 to 0.20, and a coalescent in a weight percent of between approximately 0.5 and 2 percent; and
   d.) finishing the seamless surface by applying a wet coating to the seamless surface 15 minutes after the said seamless surface is created.

10. The method as recited in claim 9 wherein the first planar substrate and the second planar substrate are rigid.

11. The method as recited in claim 9 wherein the first planar substrate and the second planar substrate are nonrigid.

12. The method as recited in claim 9 wherein the predetermined amount of the drywall joint compound is between 0.1 mm and 25.4 mm.

13. The method as recited in claim 9 wherein the coating is applied no sooner than 15 minutes after the seamless surface is created.

14. The method as recited in claim 9 wherein the first planar substrate and second planar substrate is drywall sheeting.

15. A joint compound which remains flexible upon curing comprising:

a.) an acrylate resin in a weight ratio of acrylate resin to compound of 47.2 percent;

b.) an incan preservative in a weight ratio of incan preservative to compound of 0.11 percent.;

c.) polyamide fiber in a weight ratio of fiber to compound of 1.5 percent;

d.) a latex in a weight ratio of latex to compound of 9.4 percent;

e.) a surfactant in a weight ratio of surfactant to compound selected from a range of between approximately 0.18 and 0.19 percent;

f.) a plasticizer in a weight ratio of plasticizer to compound of 6.2 percent;

g.) calcium carbonate in a weight ratio of calcium carbonate to compound of 32.1 percent;

h.) a pyrithione in a pyrithione to compound weight ratio selected from a range of between approximately 0.18 and 0.20 percent; and i.) polyacrylate microspheres in a microsphere to compound weight ratio of 2.9 percent.

* * * * *